US006687755B1

United States Patent
Ford et al.

(10) Patent No.: US 6,687,755 B1
(45) Date of Patent: Feb. 3, 2004

(54) SELECTIVELY UTILIZING AN AUTOMATICALLY GENERATED INTERNET PROTOCOL ADDRESS IN A NETWORKED ENVIRONMENT

(75) Inventors: Peter S. Ford, Carnation, WA (US); Pradeep Bahl, Redmond, WA (US); Jawad (Mohamed J.) Khaki, Sammamish, WA (US); Greg Burns, Seattle, WA (US); Frank Beeson, Kenmore, WA (US)

(73) Assignee: Microsoft Corporation, Redmond, WA (US)

( * ) Notice: Subject to any disclaimer, the term of this patent is extended or adjusted under 35 U.S.C. 154(b) by 610 days.

(21) Appl. No.: 09/605,034

(22) Filed: Jun. 27, 2000

(Under 37 CFR 1.47)

Related U.S. Application Data

(63) Continuation-in-part of application No. 09/057,135, filed on Apr. 8, 1998, now Pat. No. 6,101,499.

(51) Int. Cl.⁷ .............................................. G06F 15/16
(52) U.S. Cl. ........................ 709/245; 709/249; 709/238; 709/221
(58) Field of Search ................................ 709/245, 249, 709/238, 220, 225, 226, 227, 229; 370/217, 352, 401, 409

(56) References Cited

U.S. PATENT DOCUMENTS

| | | | |
|---|---|---|---|
| 5,673,263 A | * 9/1997 | Basso et al. | 370/396 |
| 5,812,819 A | 9/1998 | Rodwin et al. | 395/500 |
| 5,854,901 A | 12/1998 | Cole et al. | 95/200.75 |
| 5,884,038 A | 3/1999 | Kapoor | 395/200.56 |
| 5,896,498 A | * 4/1999 | Dent et al. | 713/201 |
| 6,118,768 A | * 9/2000 | Bhatia et al. | 370/254 |
| 6,240,513 B1 | * 5/2001 | Friedman et al. | 713/152 |
| 6,249,523 B1 | * 6/2001 | Hrastar et al. | 370/401 |
| 6,324,161 B1 | * 11/2001 | Kirch | 370/217 |

OTHER PUBLICATIONS

RFC 791; Internet Protocol; DARPA Internet Program Protocol Specification; Information Sciences Institute; Sep. 1981.

RFC; Internet Standard Subnetting Procedure; J. Mogul (Stanford) and J. Postel (ISI); Aug. 1985.

RFC 1531; Dynamic Host Configuration Protocol; R. Droms; Bucknell university; Oct. 1993.

* cited by examiner

*Primary Examiner*—Mahmet B. Geckil
(74) *Attorney, Agent, or Firm*—Workman, Nydegger

(57) ABSTRACT

The utilization is described of an automatically generated Internet protocol ("IP") address in a networked environment. An IP address is automatically generated and used while an IP address server is unavailable or unreliable. The system used either the automatically generated IP address or the assigned address depending on certain circumstances. For example, if the IP address server repeatedly assigns conflicting IP address, the system continues to use the generated IP address despite having received an assigned IP address from the IP address server. Also, if the communication is within a common local area network, the generated IP address is used so as to avoid encryption of the communication in accordance with TCP/IP protocol.

22 Claims, 8 Drawing Sheets

SELECTIVELY UTILIZING AN AUTOMATICALLY GENERATED INTERNET PROTOCOL ADDRESS IN A NETWORKED ENVIRONMENT

RELATED APPLICATION

This application is a continuation-in-part of U.S. patent application Ser. No. 09/057,135, filed Apr. 8, 1998, and entitled "Method and Computer Program Product for Automatically Generating an Internet Protocol (IP) Address," now U.S. Pat. No. 6,101,499 which is incorporated herein by reference.

BACKGROUND OF THE INVENTION

1. The Field of the Invention

The present invention relates to utilizing an automatically generated Internet protocol ("IP") address in a networked environment. More specifically, the present invention relates to the generation and use of an automatically generated IP address while an IP address server is unavailable or unreliable, and to the determination of whether or not to use the automatically generated IP address once an IP address server becomes available and assigns an Internet protocol address.

2. The Prior State of the Art

In a TCP/IP network, a standard for global network communications, it is necessary for each node or host on the network to have a unique Internet protocol ("IP") address. The IP address, which is a combination of four sets of numbers that are separated by periods, generally includes a network-identifying portion as well as a host-identifying portion to allow for communication between the different nodes.

Historically, IP addresses have been manually assigned or made available through an IP address server. A manually assigned IP address is assigned to a node or host by a network administrator and remains permanent for that node or host. A manual assignment of the IP address requires a minimal amount of networking knowledge by the network administrator in order to track and assure that no conflicting IP address exists on the network, which at times can become a tedious and imperfect task. Moreover, the need for an administrator is undesirable for small networks, such as those found in small business environments.

When an IP address server that is available on the network assigns an IP address, the IP address assignment is made only for the current connection. This assignment in many instances requires additional software and the use of a network administrator, which, as provided above, is undesirable for small networks. Alternatively, protocols exists, such as Dynamic Host Configuration Protocol ("DHCP"), which utilize an available IP address server and eliminate the need for a network administrator to manage IP address assignments. (DHCP is defined by RFC 1531 and is incorporated herein by reference.) Still, an assignment of an IP address by an IP address server requires the IP address server to be available. Therefore, if the IP address server is unavailable or unreliable, no valid IP address can be assigned. Hence, the unavailability or unreliability of an IP address server on a TCP/IP network prevents communication between nodes on the network since no valid IP address can be assigned.

Some non-TCP/IP networks include protocols that facilitate automatic network protocol address generation by incorporating a unique identifier, such as the Institute of Electrical and Electronic Engineers ("IEEE") 802 Ethernet address, which is commonly found in network interface cards, into the network protocol address. The use of the unique identifier reduces the possibility of conflict with other automatically generated network protocol addresses. However, with respect to a TCP/IP network, the address base for an IP address is too small to include the IEEE 802 Ethernet address, and the use of just a portion of the IEEE 802 Ethernet address will not guarantee a unique address for each node on the network.

SUMMARY OF THE INVENTION

The present invention relates to utilizing an automatically generated Internet protocol ("IP") address in a networked environment. More specifically, the present invention relates to the generation and use of an automatically generated IP address while an IP address server is unavailable or unreliable, and to the determination of whether or not to use the automatically generated IP address once an Internet protocol address server becomes available and assigns an IP address.

Embodiments of the present invention allow for the automatic generation of an IP address when an IP address server is unavailable and for the use of the automatically generated IP address. A proposed IP address is generated by selecting a network-identifying portion while deterministically generating a host-identifying portion based on information available to the IP host. By way of example, the IEEE 802 Ethernet address found in a network interface card may be used with a deterministic hashing function to generate the host-identifying portion of the IP address.

The generated IP address is tested on the network to assure that no existing IP host is using that particular IP address. If a conflict exists, which indicates that the IP address already exists, a new IP address is generated. Alternatively, if no conflict exists, the IP host uses the generated P address to communicate over the network and periodically tests for the availability of an IP address server.

When an IP address server becomes available, an embodiment of the present invention includes using the automatically generated IP address even though the IP address server has provided an IP address. This embodiment is particularly valuable when, for example, the IP address server has lost its database or otherwise continues to provide a conflicting IP address. The method includes the identification of whether a conflict exists in the IP address supplied by the IP address server. If a conflict exists, the generated IP address is used to allow communication to take place over the network.

Another embodiment of the present invention also takes place when an IP address server becomes available. As above, an IP address is automatically generated when the IP address server is unavailable. Then, upon an IP address server becoming available, the IP address server provides an IP address. Under such a scenario, this embodiment retains both the automatically generated IP address and the IP address provided by the IP address server. A determination is made to identify the IP address that will be used. By way of example, if the destination device is on the same Local Area Network (LAN), then the generated IP address is used. Otherwise, the IP address provided by the IP address server is used. This embodiment is particularly valuable because under TCP/IP protocol, when a generated IP address is used, the TCP/IP protocol may not perform certain processes that it would otherwise have been performed, such as, by way of example, encryption. Thus, encryption may be foregone in communications within the LAN by using the generated IP address when communicating within the LAN.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Figure 1:
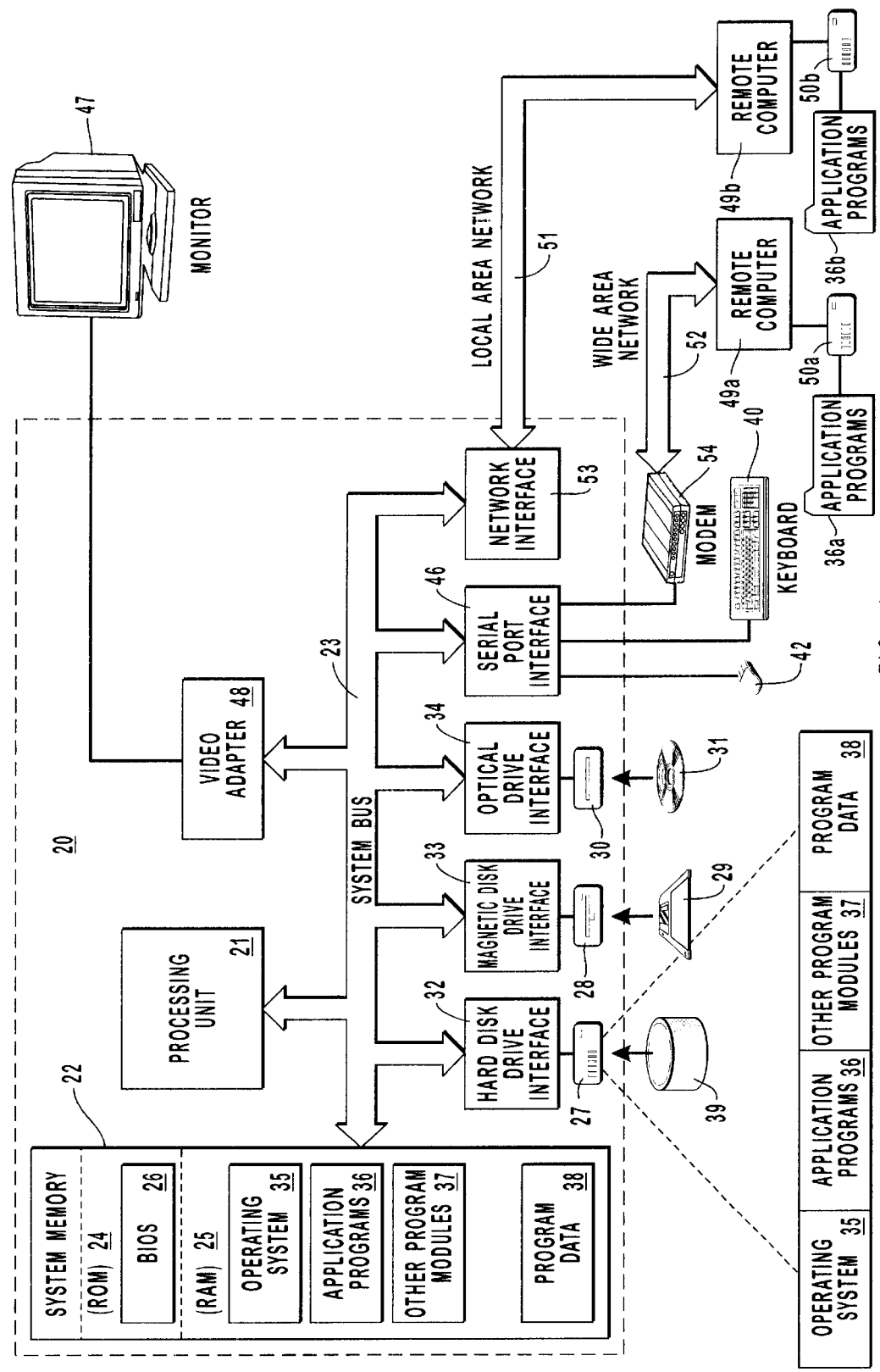
FIG. 1 illustrates an example system that provides a suitable operating environment for the present invention.

The present invention relates to selectively utilizing an automatically generated Internet protocol address ("IP") in a networked environment. More specifically, the present invention relates to the generation and use of an automatically generated IP address while an I address server is unavailable or unreliable, and to the determination of whether or not to use the automatically generated IP address once an IP address server becomes available and assigns an IP address. The embodiments of the present invention may comprise a special purpose or general purpose computer including various computer hardware, as discussed in greater detail below.

Throughout the following disclosure, reference is made to a host. In the disclosure and in the claims the term "host" refers to separately cognizable entity on an IP network. While there is typically a single IP address for each host, it is conceivable that a single host may have multiple IP addresses. References throughout the application to information available to the host refers to information that may be accessed or generated by the host processor and includes by way of example and not limitation, the network interface card IEEE 802 Ethernet address on conventional PCs and other Ethernet compatible devices, random number generators available from the host operating system, hardware serial numbers available on the host, etc.

Throughout the following disclosure, reference is also made to an IP address server and to a hashing function. In the disclosure and in the claims, the term "IP address server" refers to a host on the IP network that will manage and assign IP addresses to other hosts. Such a server may use the Dynamic Host Configuration Protocol (DHCP) to assign IP addresses to the network hosts. In the disclosure and in the claims the term "hashing function" refers to those functions known in the art that systematically covert one multi-bit representation into another, usually smaller, multi-bit representation. A hashing function is said to be deterministic if it generates the same results from the same input.

Embodiments within the scope of the present invention also include computer-readable media for carrying or having computer-executable instructions or data structures stored thereon. Such computer-readable media can be any available media which can be accessed by a general purpose or special purpose computer. By way of example, and not limitation, such computer-readable media can comprise physical storage media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 1, an example system for implementing the invention includes a general purpose computing device in the form of a conventional computer 20, including a processing unit 21, a system memory 22, and a system bus 23 that couples various system components including the system memory 22 to the processing unit 21. The system bus 23 may be any of several types of bus structures including a,memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help transfer information between elements within the computer 20, such as during start-up, may be stored in ROM 24.

The computer 20 may also include a magnetic hard disk drive 27 for reading from and writing to a magnetic hard disk 39, a magnetic disk drive 28 for reading from or writing to a removable magnetic disk 29, and an optical disk drive 30 for reading from or writing to removable optical disk 31 such as a CD-ROM or other optical media. The magnetic hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer-executable instructions, data structures, program modules and other data for the computer 20. Although the example environment described herein employs a magnetic hard disk 39, a removable magnetic disk 29 and a removable optical disk 31, other types of computer readable media for storing data can be used, including magnetic cassettes, flash memory cards, digital video disks, Bernoulli cartridges, RAMs, ROMs, and the like.

Program code means comprising one or more program modules may be stored on the hard disk 39, magnetic disk 29, optical disk 31, ROM 24 or RAM 25, including an operating system 35, one or more application programs 36, other program modules 37, and program data 38. A user may enter commands and information into the computer 20 through keyboard 40, pointing device 42, or other input devices (not shown), such as a microphone, joy stick, game pad, satellite dish, scanner, or the like. These and other input devices are often connected to the processing unit 21 through a serial port interface 46 coupled to system bus 23. Alternatively, the input devices may be connected by other interfaces, such as a parallel port, a game port or a universal serial bus (USB). A monitor 47 or another display device is also connected to system bus 23 via an interface, such as video adapter 48. In addition to the monitor, personal computers typically include other peripheral output devices (not shown), such as speakers and printers.

The computer 20 may operate in a networked environment using logical connections to one or more remote computers, such as remote computers 49a and 49b. Remote computers 49a and 49b may each be another personal computer, a server, a router, a network PC, a peer device or other common network node, and typically include many or all of the elements described above relative to the computer 20, although only memory storage devices 50a and 50b and their associated application programs 36a and 36b have been illustrated in FIG. 1. The logical connections depicted in FIG. 1 include a local area network (LAN) 51 and a wide area network (WAN) 52 that are presented here by way of example and not limitation. Such networking environments are commonplace in office-wide or enterprise-wide computer networks, intranets and the Internet.

When used in a LAN networking environment, the computer 20 is connected to the local network 51 through a network interface or adapter 53. When used in a WAN networking environment, the computer 20 may include a modem 54, a wireless link, or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing communications over wide area network 52 may be used.

Figure 2A:
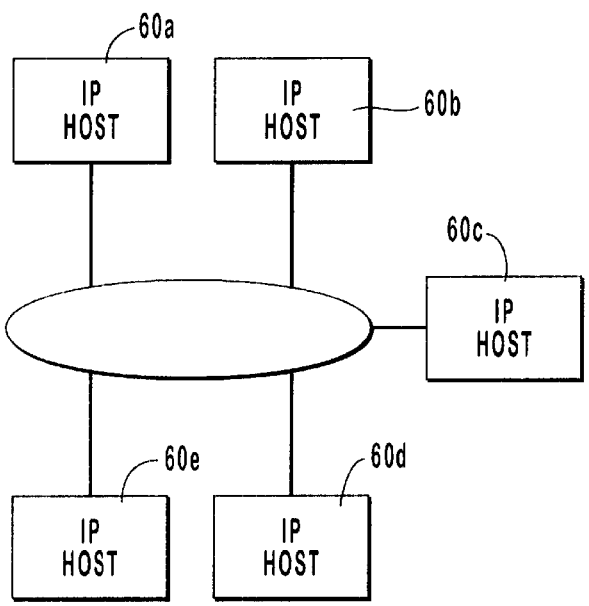
FIG. 2A illustrates an example configuration of an IP network, wherein a standalone IP network is isolated from other networks.

Referring to FIG. 2A, a number of IP hosts 60a–60e are shown interconnected in a stand-alone IP network. The network shown in FIG. 2A may be, by way of example, a LAN used by a small business, in a home, etc. Each of the IP hosts 60a–60e has a separate IP address and is able to communicate with each of the other IP hosts. Furthermore, any or all of the IP hosts may be a conventional computer system as described in connection with FIG. 1 running appropriate IP communication software.

Figure 2B:
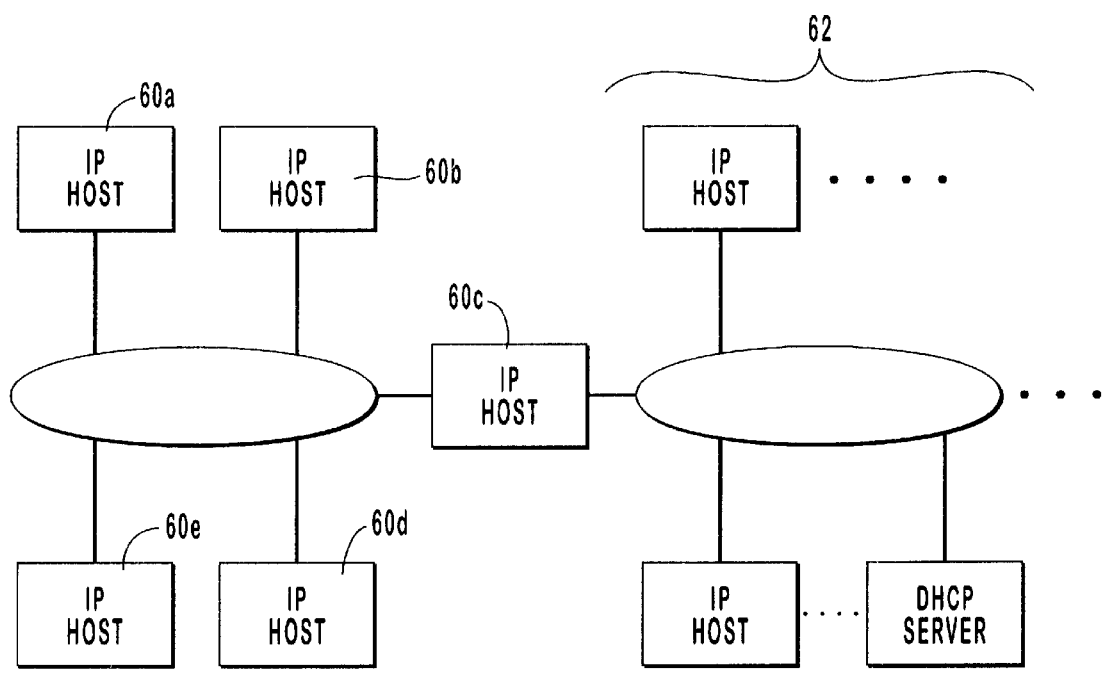
FIG. 2B illustrates another example configuration of an IP network, wherein the isolated IP network of FIG. 2A has access to other networks through one of the IP hosts, which acts as a gateway.

Referring to FIG. 2B, the stand-alone network shown in FIG. 2A is interconnected with another network through the IP host 60c. The existing network(s) may have an IP address server that could assign addresses to the IP hosts 60a–60e. A situation as shown in FIG. 2B may occur when a LAN used by a department of a company is interconnected to the corporate network. In this situation, each of the IP hosts 60a–60e receive an IP address from the IP address server on the existing network 62, as will be further explained below.

Figure 3A:
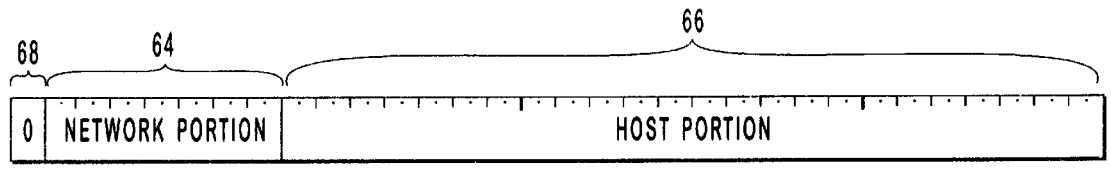
FIG. 3A illustrates an example configuration of an IP address, wherein a certain number of bits in the fixed 32-bit IP address space are assigned to a network portion while other bits are assigned to a host portion.
Figure 3B:
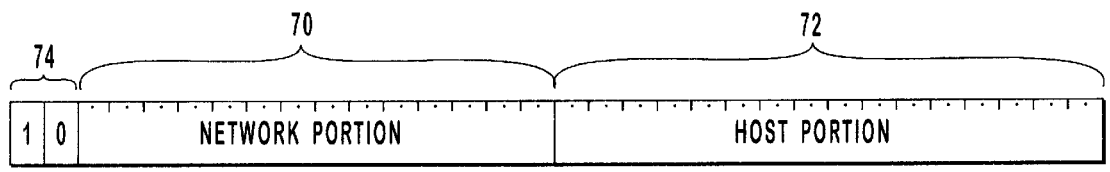
FIG. 3B illustrates a second example configuration of an IP address, wherein a certain number of bits in the fixed 32-bit IP address space are assigned to a network portion while other bits are assigned to a host portion.
Figure 3C:
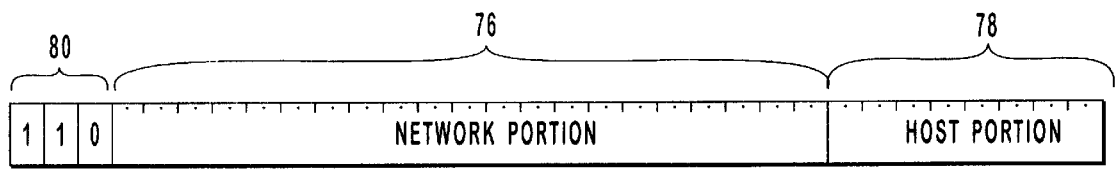
FIG. 3C illustrates a third example configuration of an IP address, wherein a certain number of bits in the fixed 32-bit IP address space are assigned to a network portion while other bits are assigned to a host portion.

Referring now to FIGS. 3A–3C, three example formats of an IP address are illustrated. An IP address is divided into three portions or regions, namely, a format indication portion, a network-identifying portion, and a host-identifying portion. All three IP address formats illustrated in FIGS. 3A–3C include a network-identifying portion that indicates the network whereon the host resides and a host-identifying portion that identifies the particular host on the designated IP network. The relative number of bits assigned to each of these portions determines the maximum number of entities that can be supported by a particular addressing format. By way of example, allocating more bits to the host-identifying portion increases the number of hosts that can exist on a single network. Alternatively, reducing the number of bits allocated to the host-identifying portion allows more networks to be supported but reduces the maximum number of hosts per network. The three example formats provide flexibility and all IP hosts are able to recognize each of the three formats.

FIG. 3A illustrates an IP address format having a relatively small network-identifying portion 64 of 7 bits and a correspondingly larger host-identifying portion 66 having 24 bits. This particular IP address format is indicated by reserved bit 68 having a value of zero.

FIG. 3B illustrates an IP address format wherein the network-identifying portion 70 is composed of 14 bits and the host-identifying portion 72 is composed of 16 bits. This IP address format is indicated by a value of '10' for the reserved bits 74. The IP address format of FIG. 3B gives approximately equal addressing capability to designate the network and the host.

FIG. 3C illustrates an IP address format wherein the network-identifying portion 76 has 21 bits, the host-identifying portion 78 has 8 bits. This IP address format is indicated by a value of '110' for the reserved bits 80. The IP address format of FIG. 3C allows for greater addressing capability to the network-identifying portion at the expense of being able to identify a smaller number of hosts. While any of the three formats may be used when automatically generating an IP address since all IP hosts recognize each format and different IP hosts may use different formats on any given IP network, it may be advantageous in some circumstances to select the format shown in FIG. 3A since it allows the greatest number of hosts to exist on a single network.

For an automatically generated IP address, some convention must be chosen so that the network portion is the same for all IP hosts on the same network. By way of example, each IP host 60a–60e shown in FIG. 2A that automatically generates its IP address should have the same number identified in the network portion regardless of format in order to conform with the IP address convention chosen.

In one embodiment of the present invention, the value of "10" is always selected for the network-identifying portion of the automatically generated IP address. This value, known as "net 10," was the value used for the Defense Advanced Research Project Agency ("DARPA") network, the historical predecessor to the current day Internet. In order to reduce confusion, the Internet body that was responsible for managing Internet addresses, Internet Assigned Numbers Authority ("IANA"), would not assign "net 10" to any existing organization. Therefore, the "net 10" value for the network-identifying portion of an IP address is relatively safe from conflict and has been used for debugging purposes and for internal networks within a corporate network structure.

Another embodiment of the present invention uses a specifically reserved value for the network-identifying portion of the IP address that has been assigned by an Internet body responsible for managing Internet addresses for automatically generated IP network addresses. By way of example, one such reserved or assigned value may be 169.254.

Another embodiment which includes another manner of consistently determining or obtaining the network-identifying portion of an IP address is to use a network protocol for obtaining the information for the portion directly or indirectly from other devices attached to the network. While three example manners of consistently determining or obtaining the network-identifying portion of an IP address have been provided above, those skilled in the art can appreciate that other mechanisms exist that allow for consistent and predictable generation of the same network-identifying portion of an IP address and are included in embodiments of the present invention.

Figure 4A:
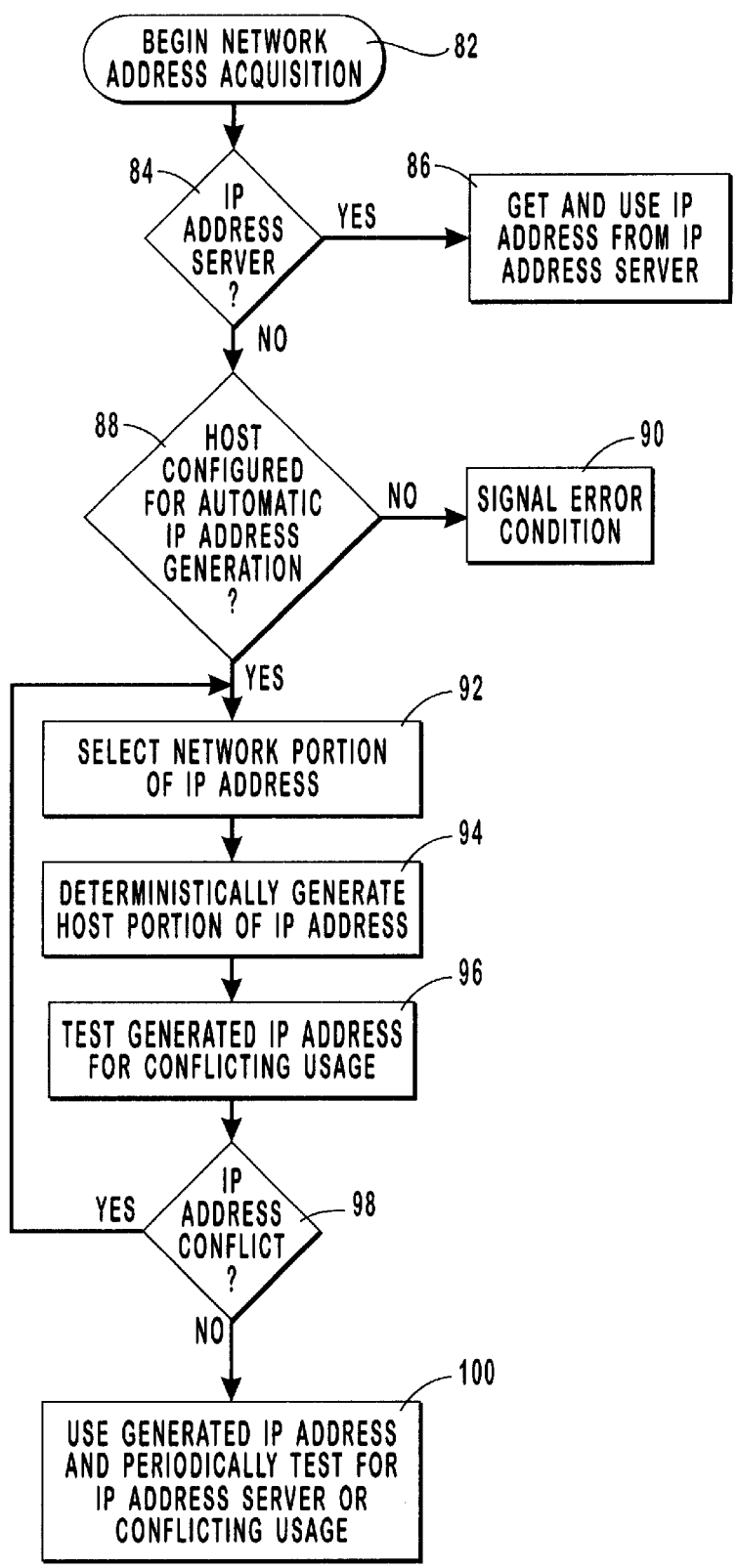
FIG. 4A is a flow chart illustrating an example manner for an IP host to automatically generate an IP address for use on an IP network where an IP address server is initially not available.

Referring now to FIG. 4A, a flow chart illustrating the process steps taken by an IP host according to an embodiment of the present invention is provided. IP address acquisition begins at step 82 and step 84 determines whether an IP address server is present. If an IP address server is present to provide a valid IP address, an IP address is received from the IP address server at step 86.

To test for the IP address server at step 84, the IP host sends messages over the IP network according to a certain protocol, such as, by way of example, Dynamic Host Configuration Protocol ("DHCP"), to identify itself to the IP address server. The IP address server may then participate in a session that allows the assignment of an IP address from the IP address server to the IP host, again according to a prescribed protocol, such as DHCP. Using such a protocol is an example of a means for determining the presence or absence or an IP address server. After receiving the IP address at step 86, the host will use that IP address indefinitely and the IP address acquisition operation terminates (not shown).

If an IP address server is not available at step 84 as the host boots up on the IP network and gives the appropriate protocol to signal a desire for an IP address, a determination is made at step 88 as to whether the host is configured for automatic IP address generation. If the host is not configured for automatic IP address generation, an error condition will be signaled at step 90 before ending the IP address acquisition. The error condition signals the user that IP network communication is not possible at that particular time.

After determining that the host is configured for automatic IP address generating at step 88, the network-identifying portion of the IP address will be selected at step 92. As explained previously, one embodiment of the present invention chooses the "net 10" value for the network-identifying portion of the IP address. An important element is to consistently select the same network number value regardless of the method implemented for making that selection. For example, a fixed number may be always chosen (e.g., "net 10" or a "reserved" value), a common number may be accessed in a predetermined manner from a file, the network, or some other source and all such methods are considered means for consistently selecting the network-identifying portion of an IP address. Furthermore, as explained previously, any format of the IP address as shown in FIGS. 3A–3C may be used.

Next, the host-identifying portion of the IP address is deterministically generated at step 94. One preferred way of generating the host-identifying portion of the IP address is to begin with a known value available to the IP host and use a deterministic hashing algorithm to generate the host portion of the IP address. For example, the network interface card IEEE 802 Ethernet address, which is too large to fit directly into the host-identifying portion of an IP address, may be deterministically hashed to arrive at a value that will fit within the length confines of the host portion of the IP address. Other values available to an IP host may also be used, such as, by way of example, random number generation from the host operating system, motherboard serial numbers, etc. The IEEE 802 Ethernet address value is preferred due to its globally unique nature that, with the use of an appropriate deterministic hashing algorithm, would result in less usage conflicts for an automatically generated IP address and its high availability in PC networks.

Any other method that results in a high likelihood that each host generates a unique, deterministic value for the host-identifying portion may be used and would in like manner be considered as a means for deterministically generating the host-identifying portion of an IP address. It is preferred that the process be computationally efficient as well to eliminate large delays in the generation process.

A preferred hashing algorithm is deterministic in the sense that a given input generates the same output each time the algorithm is applied. The hashing algorithm should also be capable of being rehashed in the event that a usage conflict occurs wherein the host-identifying portion generated by the original hash corresponds to an address already in use. Rehashing is generally performed by feeding the results of the first hash back into the algorithm to generate a new output. Finally, the hashing algorithm should have a good avalanche characteristic in order to more evenly spread out the hash results across the available values.

Before using the automatically generated IP address, it is tested for conflicting usage by other IP hosts on the network at step 96. One way of or means for doing such testing is for the IP host to send a message out on the IP network addressed to the automatically generated IP address. If a response is received, then another host on the IP network is using that particular IP address. Those skilled in the art will recognize that other ways and variations for determining IP address conflicts exist, any one of which may be used for purposes of testing an IP address for conflicting usage. All that is required is for the host to determine if another host on the network is already using the generated IP address.

If an IP address usage conflict is identified at step 98, the IP address is regenerated in the manner explained previously in connection with steps 92 and 94. Note that since "net 10" is chosen for the network-identifying portion of the IP address for this embodiment, only the host-identifying portion of the IP address needs to be regenerated. This is typically done by rehashing the IEEE 802 Ethernet address and testing the new rendition of the generated IP address having the newly generated host-identifying portion for usage conflict again at step 96. This process may occur for a predetermined number of times or until no conflict usage is identified at step 98. Note that rehashing is only one means of regenerating the IP address and those skilled in the art will recognize that other means exist that accomplish the same purpose.

At step 100, the generated IP address is used by the IP host for communicating on the IP network. Also at step 100 periodic tests are made to determine if an IP address server has become available over the IP network since the IP address was generated or to determine if there is conflicting usage of the IP address. Each of these two situations may potentially indicate a change for the IP host in using the generated IP address. One way or means for monitoring conflicting IP address usage is to periodically send a message to the generated IP address and wait for a response as explained previously in connection with step 96.

Figure 4B:
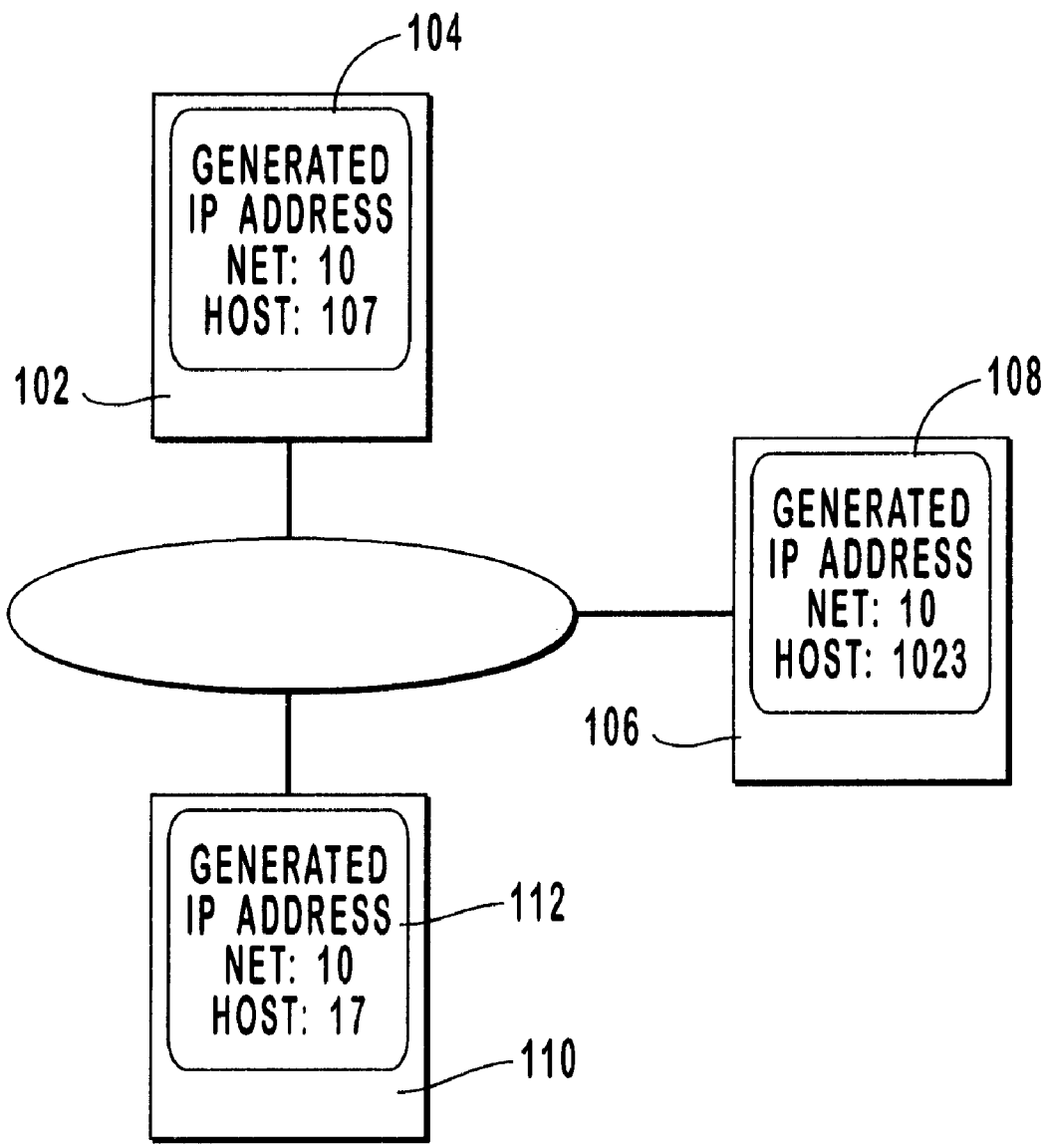
FIG. 4B illustrates IP hosts that automatically generate their IP addresses while on a stand-alone IP network.

Referring now to FIG. 4B, an example implementation of the use of a generated IP address is illustrated. In FIG. 4B, IP addresses are initially generated on a LAN used by a department of a company that is eventually integrated into the corporate-wide network having an IP address server. Each IP host 102, 106, and 110 has automatically generated and tested an IP address according to the processing steps explained previously in connection with the flowchart of FIG. 4A. Specifically, host 102 is using generated IP address 104 having a network portion of 10 and a host portion of 107, thereby having an IP address of 10.0.0.107. Host 106 is using generated IP address 108 having a network portion of 10 and a host portion of 1023, thereby having an IP address of 10.0.3.255. Host 110 is using generated IP address 112 having a network portion of 10 and a host portion of 17, having an IP address of 10.0.0.17.

One or more of the generated IP addresses may have had an initial conflict but such has been resolved by rehashing to get a second or more order hash of the IEEE 802 Ethernet address found in the network interface card of the conventional PC that makes up each respective host. In most instances, each time a host is powered on and "active" on the network 112, it will have the same IP address due to the deterministic nature of the hashing algorithm generating the host-identifying portion of the address. This configuration allows the respective IP hosts to be physically attached to the network hardware, powered on, and immediately communicating on the network 112 without the need of any explicit configuration with respect to an IP address.

Figure 5A:
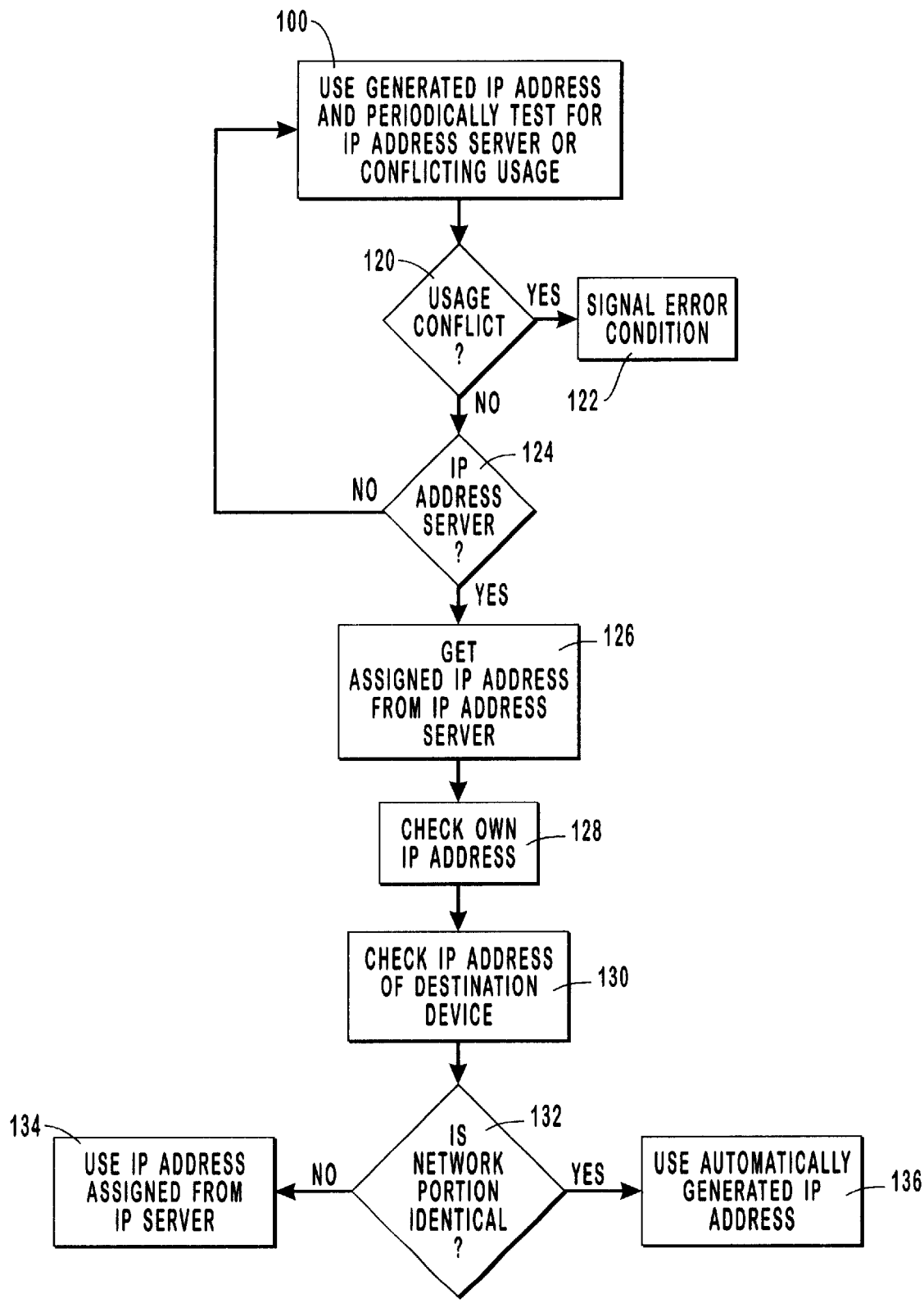
FIG. 5A is a flow chart illustrating an example manner for a host to utilize an automatically generated IP address upon an IP address server becoming available and assigning an IP address.

Referring now to FIG. 5A, a flow chart is provided that illustrates an example method of selectively utilizing the generated IP address after an IP address server is available and assigns an IP address to the IP host. As provided above, at step 100 of FIG. 4A (also illustrated in FIG. 5A) the generated IP address is used by the IP host for communicating on the IP network and periodic tests are made to determine if an IP address server has become available over the IP network since the IP address was generated.

The determination of whether there is a conflicting usage of the IP address is performed at step 120 of FIG. 5A. If a conflict usage is identified at step 120, the generated IP address is also being used by another IP host. In this case, an error indication is signaled at step 122. Because this situation may be extremely detrimental and is very uncommon due to previous conflict testing at step 96 of FIG. 4A, one embodiment simply shuts down the IP stack and no longer processes network messages. The host user is then made aware through the user interface that a catastrophic error has occurred. Alternatively, rather than shut down the IP stack with an error, other embodiments attempt to generate a new IP address.

If no conflicting usage is identified at step 120 and no IP address server has become available at step 124, use of the generated IP address continues at step 100 until more periodic tests are made. In one embodiment, testing for an IP address server is done by sending messages according to the DHCP protocol. Note that this test can be the same test described in conjunction with step 84 of FIG. 4A above and serves as a means for ascertaining if an IP address server later becomes available.

If an IP address server later becomes available at step 124, the IP host will interact with the IP address server in order to get an assigned IP address from the IP address server at step 126. DHCP is one protocol that may be implemented as a means for requesting and receiving an IP address for an IP host. Also included in the action of getting an assigned IP address from an IP address server is a check to determine if the assigned IP address is unique. By way of example, this determination can be made by sending a request to the IP address. If a response is received from another IP host, then the assigned IP address is not unique and a new IP address is assigned by the IP address server. Once an assigned IP address is obtained from an IP address server and the assigned IP address is determined to be unique, execution proceeds to step 128. Despite receiving the assigned IP address, the IP host still retains the generated IP address in the example of FIGS. 5A and 5B so as to allow for the selective use of either the generated IP address or the assigned IP address as described hereinafter.

One reason for using a generated IP address instead of the assigned IP address is to avoid needless encryption when communicating to devices in the same network. For security purposes, it is often desirable to encrypt electronic information, particularly when communicating over low security links as is often the case when communicating over the Internet. Currently, the TCP/IP protocol automatically encrypts communication when using an assigned IP address. However, encryption requires many processing cycles. If communicating within a LAN, there may be no need to encrypt.

Therefore, as illustrated in FIG. 5A, a determination is made as to whether or not the communication is within the same LAN. If the communication is within the same LAN, the generated IP address is used in order to avoid encrypting the communication thus saving the processing cycles required for encryption. Alternatively, if the communication is not within the same LAN, the IP address assigned by the IP address server is used and the communication is encrypted according to standard TCP/IP protocol for communications using assigned IP addresses.

The method then performs a step for selectively using either the automatically generated IP address or the assigned IP address depending on whether or not a communication is occurring entirely within the local area network. This step for selectively using is illustrated in FIG. 5A by the combination of step 128, step 130, decision block 132, step 134 and step 136. In order to determine whether the communication is within the same LAN, execution proceeds to step 128 to check the IP address of the sending IP host and to step 130 to check the IP address of the destination IP host. Decision block 132 determines whether the network-identifying portion of the IP address of the sending IP host and the network-identifying portion of the IP address of the destination IP host are identical. If the network-identifying portions are not identical, the communication is not to be within a common LAN and, therefore, the IP address assigned from the IP address server is used, as indicated at step 134. Alternatively, if decision block 132 determines that the network-identifying portions are identical, the communication is to be within a common LAN and, therefore, the generated IP address is used, as indicated at step 136. Therefore, if the communication is within the same LAN, the automatically generated IP address is used. The TCP/IP protocol dictates that the use of the automatically generated IP address means that encryption is foregone. Therefore, communications within a common LAN forego encryption as is often desired. On the other hand, if the communication is not within the same LAN, the assigned IP address is used. The TCP/IP protocol dictates that the use of the assigned IP address means that encryption is to be performed. Therefore, communications not within a common LAN are encrypted to account for the increased security concerns in inter-network communications. Therefore, different processes may be performed on the communication depending on whether the communication is within a common LAN.

Figure 5B:
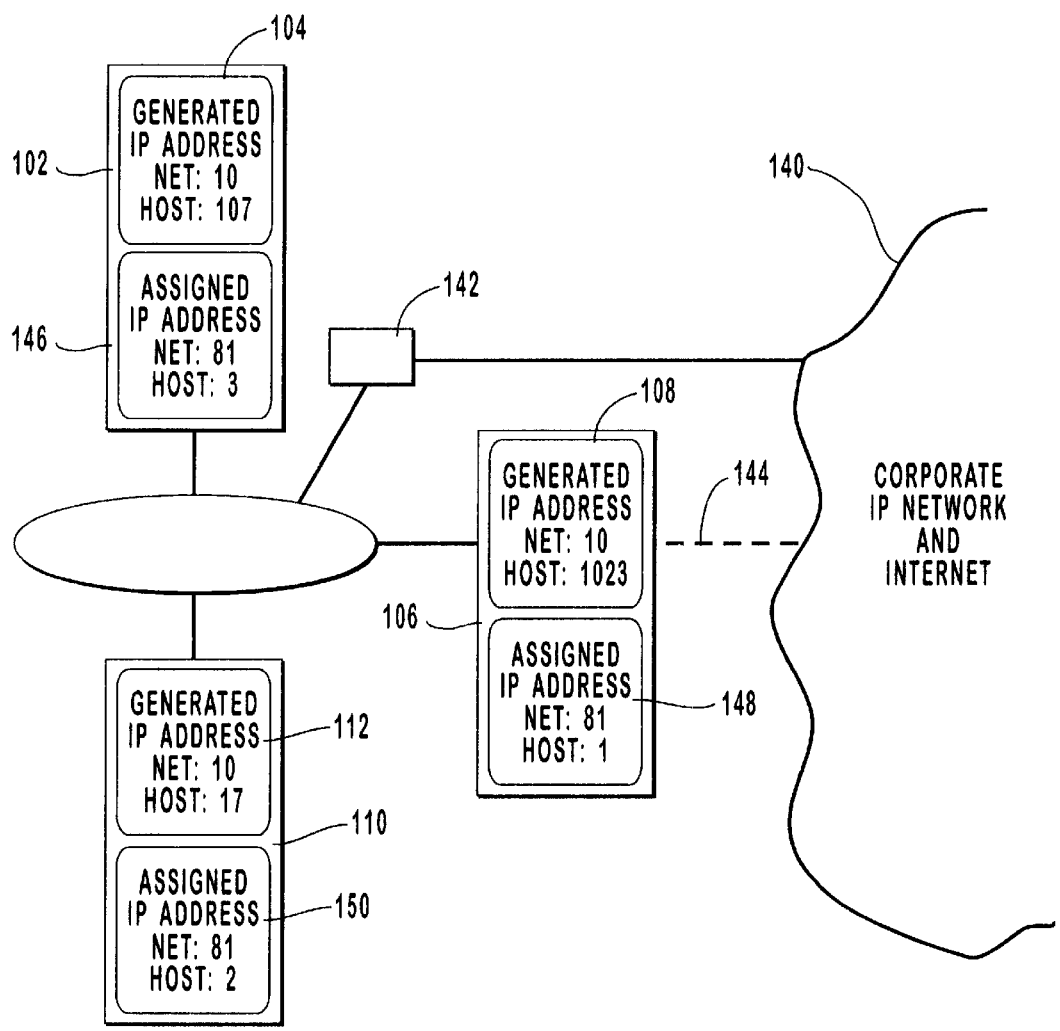
FIG. 5B illustrates IP hosts that have automatically generated their IP addresses while on a stand-alone IP network, as depicted in FIG. 4B, and then, upon connection to a corporate IP network, have each received an assigned IP address.

Referring now to FIG. 5B, an example implementation of the embodiment illustrated in FIG. 5A is shown. In FIG. 5B, the automatically generated IP address of FIG. 4B are supplemented with the assigned IP address from an IP address server as the LAN is integrated into a larger network that has an IP address server. In the example of FIG. 5B, this larger network includes a corporate network 140 that is connected to the Internet. The LAN is integrated into the corporate network 140 through suitable router hardware 142. Note that, alternatively, one of the IP hosts, such as host 108 may function as a router to make the logical integration of the network 112 into the corporate IP network 140 as represented by dashed line 144.

Once connected onto the corporate IP network, an assigned IP address server will become available to each respective host 102, 106, and 110. Each host will "discover" the IP address server during execution of a periodic test as described in connection with step 100 of FIG. 4A above. After going through the appropriate interaction, such as DHCP, each respective host 102, 106, and 110 will receive an assigned IP address from the IP address server. Specifically, host 102 has an assigned IP address 146 having an assigned network portion of 81 and an assigned host portion of 3, thereby having an assigned IP address of 81.0.0.3. Host 106 has an assigned IP address 148 having an assigned network portion of 81 and an assigned host portion of 1, therefore having an IP address of 81.0.0.1. Host 110 has an assigned IP address 150 having an assigned network portion of 81 and an assigned host portion of 2, thereby having an IP address of 81.0.0.2. As provided above, the hosts 102, 106, and 110 retain both the generated IP address 104, 108, and 112 and the assigned IP address 146, 148, and 150 in order to selectively use either the generated IP address or the assigned IP address.

Figure 6:
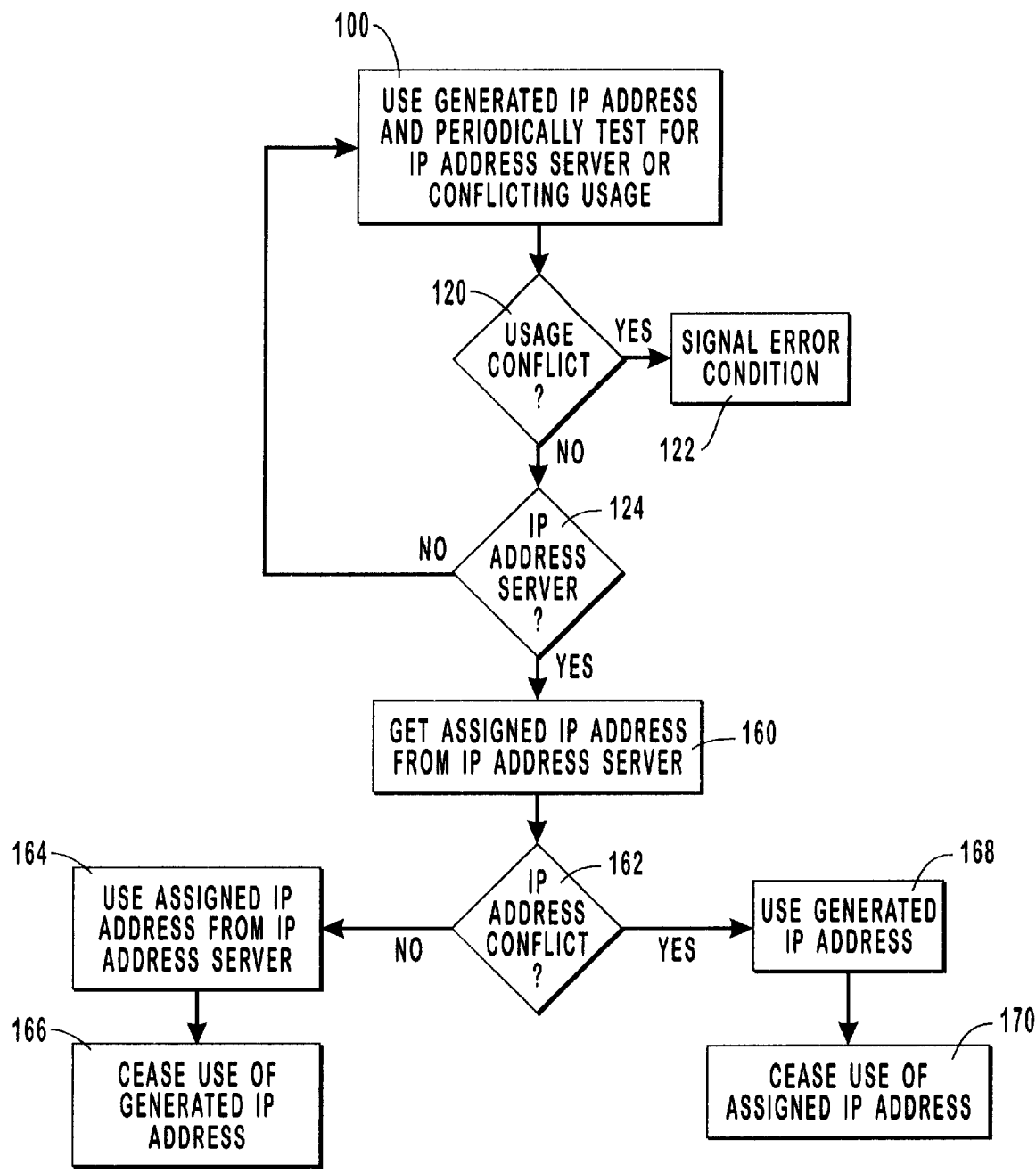
FIG. 6 is a flow chart illustrating another example manner for a host to utilize an automatically generated IP address upon an IP address server becoming available and assigning an IP address.

Referring now to FIG. 6, a flow chart is shown that illustrates another example manner of utilizing the generated IP address after an IP address server is available and assigns an IP address. As provided above, at step 100, of FIG. 4A (also illustrated in FIG. 6) the generated IP address is used by the IP host for communicating on the IP network and periodic tests are made to determine if an IP address server has become available over the IP network since the IP address was generated.

The determination of whether there is a conflicting usage of the IP address is performed at step 120 of FIG. 6. If a conflict usage is identified at step 120 because the generated IP address is also being used by another IP host, then an error indication is signaled at step 122. In this situation, one embodiment simply shuts down the IP stack and no longer processes network messages, as provided above. Other embodiments attempt to generate a new IP address.

If no conflicting usage is identified at step 120 and no IP address server has become available at step 124, use of the generated IP address continues at step 100 until more periodic tests are made. If an IP address server later becomes available at step 124, the IP host will interact with the address server in order to get another IP address at step 160. As explained above, DHCP is one protocol that may be implemented as a means for requesting and receiving an IP address for an IP host. Execution then proceeds to a step for selectively using either the automatically generated IP address or the assigned IP address depending on whether the assigned IP address is in conflict. This step is illustrated in FIG. 6 by the combination of decision block 162, step 164, step 166, step 168 and step 170. The embodiment illustrated in FIG. 6 is particularly valuable when, by way of example, the IP address server has lost its database used for assigning IP addresses or otherwise continues to provide a conflicting IP address, which includes a non-unique IP address.

Execution proceeds to decision block 162 to determine whether or not a conflict exists in the IP address assigned by the IP address server. If, at decision block 162, it is determined that no conflict exists in the assigned IP address, execution proceeds to step 164 where the assigned IP address is used and then to step 166 where use of the generated IP address is ceased.

Implementations may vary as to how quickly to cease use of the generated IP address at step 166. For example, use of the generated IP address may be immediately cut off upon receipt of the IP address from the IP address server. Alternatively, only existing sessions that previously used the generated IP address continue to use the generated IP address while new sessions used the assigned IP address thereby gradually decreasing the use of the generated IP address. Another alternative is that both addresses may be used simultaneously, as provided in relation to FIGS. 5A and 5B. Software running on the IP host will control the continued use or disuse, whether gradual or immediate, of the generated IP address according to a variety of factors. This software constitutes a means for gradually discontinuing the use of the generated IP address.

If, at decision block 162, it is determined that a conflict exists in the assigned IP address, execution proceeds to step 168 where the generated IP address is used and then to step 170 where use of the assigned IP address is ceased.

The methods described above discuss various testing of automatically generated IP addresses to be sure that the generated IP address are not in conflict with other IP hosts. However, the chances of a conflict may be reduced by having the IP address server assign distinct ranges of acceptable IP addresses to each distinct network that is capable of automatically generating IP addresses. In this example, a "distinct network" means a network in which all IP hosts may communicate without the assistance of a router. Whenever one of these distinct networks automatically generates an IP address, the IP address is within the range assigned by the IP address server. Since the ranges originally assigned by the IP address server are non-conflicting, the IP addresses automatically generated by a given network are not likely to conflict with the IP addresses automatically generated by another network. Further, this allows IP hosts on multiple IP networks that are capable of automatically generating IP addresses (hereinafter, an "auto-IP" network) to use a source address that as appropriate for the auto-IP network they communicate over. Also, when two auto-IP networks that are separated by a router are joined (i.e. the router is removed), then the nodes on each LAN continue to function seamlessly without an IP address conflict since the nodes acquired their IP addresses from distinct IP ranges.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a networked computing environment including a local area network containing one or more host computers, wherein a first IP address is generated by one of the host computers and a second IP address is received by the host computer on the local area network from an IP address server, a method for determining which IP address to use when a sending device in the local area network communicates with a destination device, the determination depending on whether the IP address received from the IP address server is in conflict, the method comprising the following:

an act of automatically generating an IP address;

an act of receiving an assigned IP address from an IP address server;

an act of determining whether the assigned IP address received from the IP address server is in conflict;

in response to the act of determining, if the IP address received is in conflict, an act of using the generated IP address; and in response to the act of determining, if the IP address received is not in conflict, an act of using the assigned IP address received from the IP address server.

2. A method in accordance with claim 1, wherein the act of receiving an assigned IP address and the act of determining recurs a predetermined number of times if the assigned IP address is determined to be in conflict.

3. A method in accordance with claim 1, further comprising the following:

if the IP address received is in conflict, an act of ceasing to use the assigned IP address.

4. A method in accordance with claim 1, further comprising the following:

if the IP address received is not in conflict, an act of ceasing to use the generated IP address.

5. A computer program product for implementing within a computer system a method for determining which IP address to use when a sending device in the local area network communicates with a destination device, the determination depending on whether the IP address received from the IP address server is in conflict, the computer program product comprising:

a computer readable medium for providing computer program code means utilized to implement the method, wherein the computer program code means is comprised of executable code for implementing the following:

an act of determining whether an assigned IP address received from an IP address server is in conflict;

in response to the act of determining, if the assigned IP address is in conflict, an act of using an automatically generated IP address; and in response to the act of determining, if the assigned IP address received is not in conflict, an act of using the assigned IP address received from the IP address server.

6. A computer program product in accordance with claim 5, wherein the computer-readable medium comprises a physical storage medium.

7. In a networked computing environment including a local area network containing one or more host computers, wherein a first IP address is generated by one of the host computers and a second IP address is received by the host computer on the local area network from an IP address server, a method for determining which IP address to use when a sending device in the local area network communicates with a destination device, the determination depending on whether the IP address received from the IP address server is in conflict, the method comprising the following:

an act of automatically generating an IP address;

an act of receiving an assigned IP address from an IP address server;

a step for selectively using either the automatically generated IP address or the assigned IP address depending on whether the assigned IP address is in conflict.

8. A method in accordance with claim 7, wherein the step for selectively using either the automatically generated IP address or the assigned IP address depending on whether the assigned IP address is in conflict comprises the following:

an act of determining whether the assigned IP address received from the IP address server is in conflict;

in response to the act of determining, if the IP address received is in conflict, an act of using the generated IP address; and in response to the act of determining, if the IP address received is not in conflict, an act of using the assigned IP address received from the IP address server.

9. A method in accordance with claim 8, wherein the act of receiving an assigned IP address and the act of determining recurs a predetermined number or times if the assigned IP address is determined to be in conflict.

10. A method in accordance with claim 8, further comprising the following:

if the IP address received is in conflict, an act of ceasing to use the assigned IP address.

11. A method in accordance with claim 8, further comprising the following:

if the IP address received is not in conflict, an act of ceasing to use the generated IP address.

12. In a networked computing environment including a local area network containing one or more host computers, wherein a first IP address is generated by one of the host computers and a second IP address is received by the host computer on the local area network from an IP address server, a method for determining which IP address to use when a sending device in the local area network communicates with a destination device, depending on the location of the destination device, wherein different communication protocols may be implemented based on the location of the destination device, the method comprising the following:

an act of automatically generating an IP address;

an act of receiving an IP address from an IP address server; and an act of determining whether the network portion of a source IP address matches the network portion of a destination IP address;

an act of using the automatically generated IP address if the network portion of the source IP address matches the network portion of the destination IP address; and an act of using the assigned IP address if the network portion of the source IP address does not match the network portion of the destination IP address.

13. A method in accordance with claim 12, wherein the network portion of the source IP address reads 10.

14. A method in accordance with claim 12, wherein the network portion of the source IP address reads 169.254.

15. A method in accordance with claim 12, further comprising the following:

an act of encrypting communications from the sending device to the destination device if the sending device and the destination device reside in different LANs; and an act of foregoing encrypting of communications from the sending device to the destination device if the sending device and the destination device reside in a common LAN.

16. A computer program product for implementing within a computer system a method for determining which IP address to use when a sending device in the local area network communicates with a destination device, the determination depending on whether the sending device and the destination device are both within a common local area network, the computer program product comprising:

a computer readable medium for providing computer program code means utilized to implement the method, wherein the computer program code means is comprised of executable code for implementing the following:

an act of determining whether the network portion of a source IP address associated with the sending device matches the network portion of a destination IP address associated with the destination device;

an act of using an automatically generated IP address if the network portion of the source IP address matches the network portion of the destination IP address; and an act of using an IP address assigned from an IP address server if the network portion of the source IP address does not match the network portion of the destination IP address.

17. A computer-program product in accordance with claim 16, wherein the computer-readable medium comprises a physical storage medium.

18. In a networked computing environment including a local area network containing one or more host computers, wherein a first IP address is generated by one of the host computers and a second IP address is received by the host computer on the local area network from an IP address server, a method for determining which IP address to use when a sending device in the local area network communicates with a destination device, depending on the location of the destination device, wherein different communication protocols may be implemented based on the location of the destination device, the method comprising the following:

an act of automatically generating an IP address;

an act of receiving an IP address from an IP address server; and a step for selectively using either the automatically generated IP address or the assigned IP address depending on whether or not a communication is occurring entirely within the local area network.

19. A method in accordance with claim 18, wherein the step for selectively using either the automatically generated IP address or the assigned IP address depending on whether or not a communication is occurring entirely within the local area network comprises the following:

an act of determining whether the network portion of a source IP address matches the network portion of a destination IP address;

an act of using the automatically generated IP address if the network portion of the source IP address matches the network portion of the destination IP address; and an act of using the assigned IP address if the network portion of the source IP address does not match the network portion of the destination IP address.

20. A method in accordance with claim 18, wherein the network portion of the source IP address reads 10.

21. A method in accordance with claim 18, wherein the network portion of the source IP address reads 169.254.

22. A method in accordance with claim 18, further comprising the following:

an act of encrypting communications from the sending device to the destination device if the sending device and the destination device reside in different LANs; and an act of foregoing encrypting of communications from the sending device to the destination device if the sending device and the destination device reside in a common LAN.

* * * * *